FIG.2A.

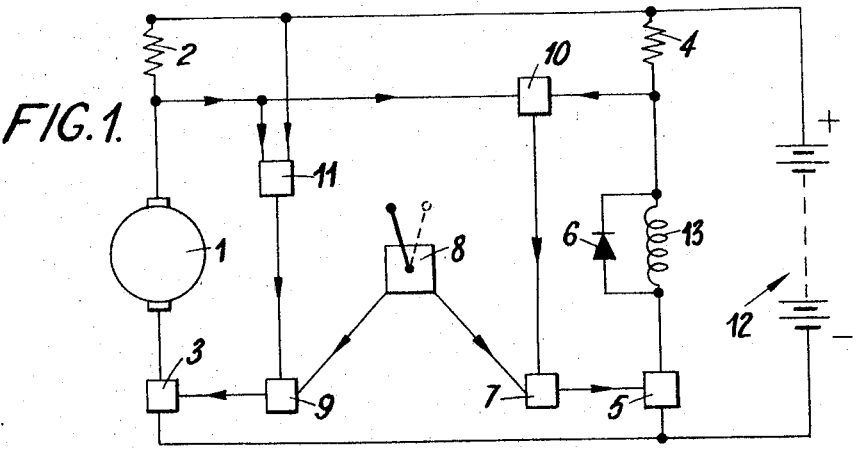

Jan. 10, 1967     I. S. PAYNE     3,297,930

ELECTRIC MOTORS FOR EXAMPLE FOR DRIVING INDUSTRIAL TRUCKS

Filed March 25, 1964     4 Sheets-Sheet 4

FIG.3.

United States Patent Office 3,297,930
Patented Jan. 10, 1967

3,297,930
ELECTRIC MOTORS FOR EXAMPLE FOR DRIVING INDUSTRIAL TRUCKS
Ivan Salisbury Payne, Basingstoke, England, assignor to Lansing Bagnall Limited, Basingstoke, England, a British company
Filed Mar. 25, 1964, Ser. No. 354,627
Claims priority, application Great Britain, Mar. 26, 1963, 11,889/63
7 Claims. (Cl. 318—269)

The invention relates to direct current electric motors and control apparatus therefor, and is more particularly, but not exclusively, concerned with such motors and apparatus for use with trucks or other vehicles powered by batteries or fuel cells.

The invention provides the combination with an electric motor of control apparatus, which control apparatus comprises pulse-generating means for producing intermittent pulses of current for energising the field windings of the motor, and a regulating device for varying the time interval between pulses and/or the length of each pulse to vary the average current in the field windings only, which control apparatus is arranged to control the current in the field winding under all conditions of motor-speed and motor load.

Thus it is possible to provide powerful excitation of field windings when required, without dissipation of energy in resistances when this powerful excitation is not required.

Preferably the control apparatus includes an automatic device for controlling the regulating device to control the average current in the field winding in a predetermined manner dependent upon the motor conditions. For example, it may be that a field current of at least certain strength is desirable because of the load, speed, torque or temperature of the motor. Preferably the automatic device comprises a device for detecting when the ratio of the armature current to the average field current exceeds a predetermined value and thereupon causing the regulating device to increase the average field current.

Preferably the control apparatus includes current control means for varying the armature current for starting and slow speed operation. The aforesaid pulse-generating means and regulating means which control the field current may also provide the current control means for the armature current during starting and low speed operation. Alternatively, the current control means for the armature current may comprise further pulse generating means for producing intermittent pulses for energising the armature windings of the motor, and regulating means for varying the time interval between pulses and/or the length of each pulse to vary the average current in the armature windings.

Preferably the arrangement is such that regenerative braking of the motor is obtained by increasing the field strength under suitable conditions. Preferably the arrangement is such that regenerative braking of the motor is obtained when the average field winding current is increased (provided that the motor speed is sufficiently high) and means is provided for automatically retaining the field winding current substantially unaltered to retain the aforesaid regenerative braking (as long as the motor speed remains sufficiently high to provide useful regenerative braking as aforesaid). Preferably the said automatic means acts to retain the field winding current as aforesaid by effecting an overriding control on the regulating means.

Preferably the control system includes an adjustable device for adjusting the control system to control the motor speed, and automatic control means overriding the adjustable device to retain the field winding excited after the adjustable device has been returned to its off position, and to connect the motor armature, in such a way that rheostatic braking is provided.

Two specific embodiments of the invention will now be described by way of example and with reference to the accompanying drawings in which:

FIGURE 1 is a schematic block diagram of one form of control system and motor,

FIGURES 2A and 2B show a circuit diagram of that control system, and

FIGURE 3 is a simplified circuit diagram of another form of control system and motor.

Figure 2A:
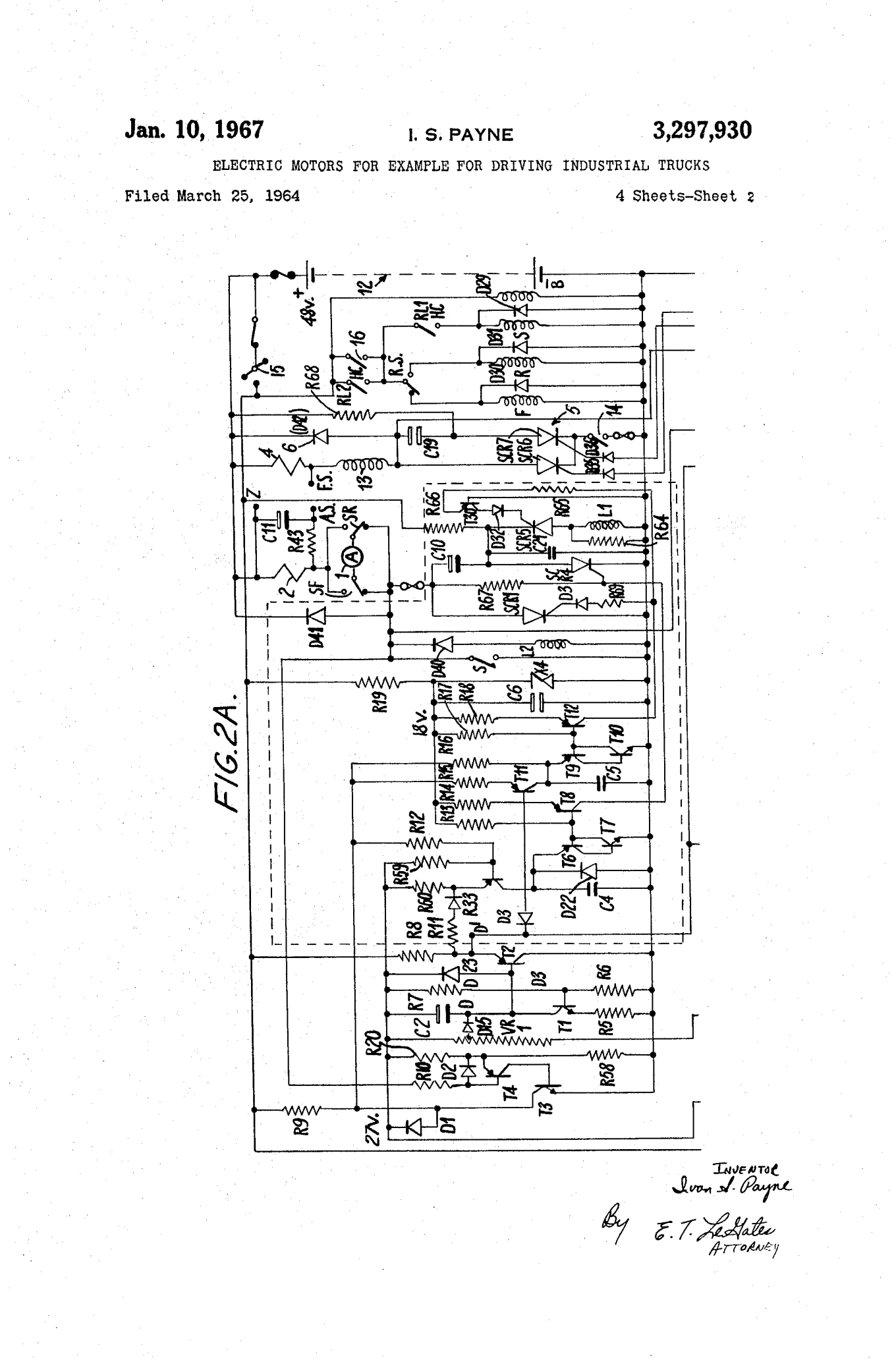
Figure 2B:
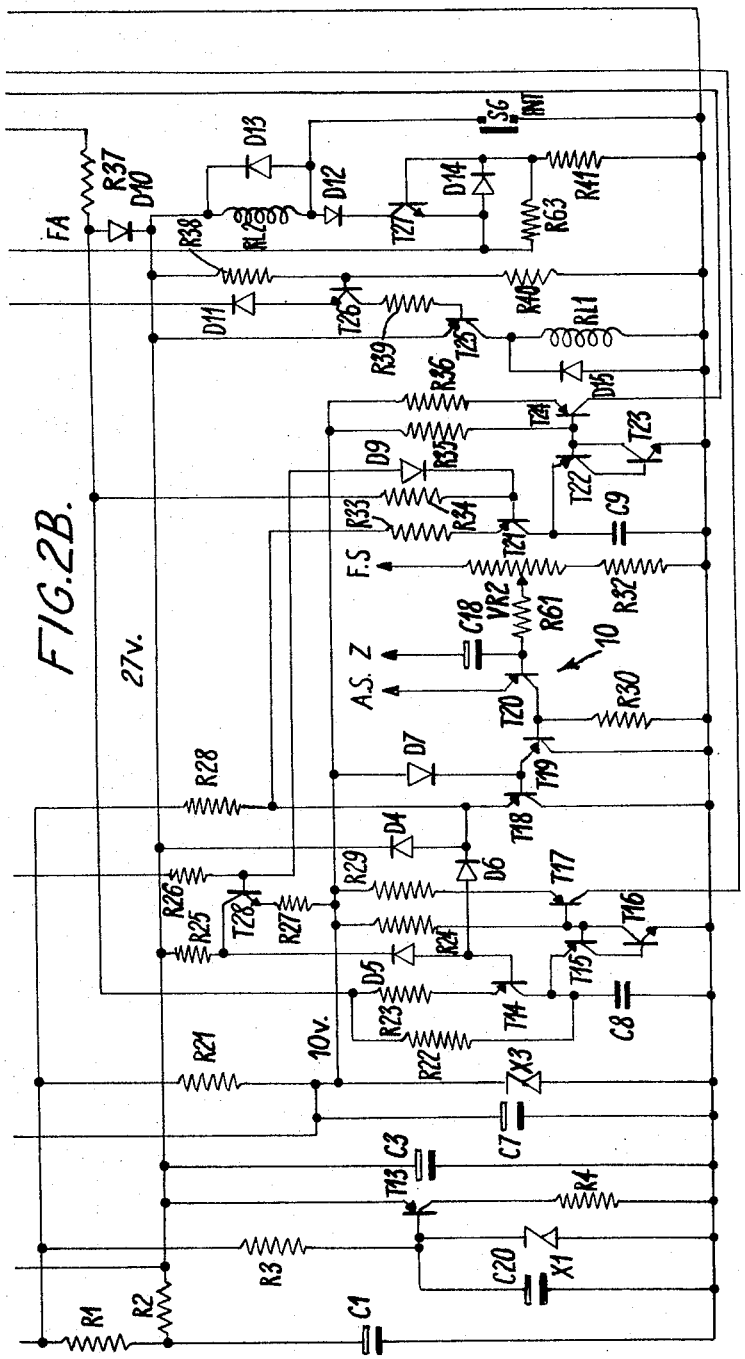

In the example illustrated in FIGURES 1 and 2, the armature and field currents are controlled by separate pulsing devices both these devices being based on thyristors the gates of which are controlled by transistorised oscillators arranged to give both pulse width and frequency modulation.

FIGURE 1 is intended to show the principle of operation. The motor armature 1 is connected to the power source 12 via a low resistance 2 and a starting means 3 (which may consist of resistors and switches or any known starting means, for example a pulse generator supplying the armature with a series of pulses of current of variable on/off ratio) whose operation is controlled by a regulating device 9. The field winding 13 is fed via a low resistance 4 and pulse generating means 5 for producing pulses of current of varying on/off ratio. A rectifier 6 is provided so that the inductance of the field can maintain current during the off periods. The on/off ratio of pulse generating device 5 is determined by a regulating device 7 which is controlled by a manual or otherwise operated control means 8 which also controls the starting pulse generator 3 via the regulating device 9.

The ratio of the armature current to the field current is measured by sensing device 10 which senses the ratio of the voltage drops in resistances 2 and 4 and which when necessary can override the control exercised on the regulating device 7 by control means 8. Similarly the direction and magnitude of the volt drop across resistor 2 is measured by sensing device 11, which when necessary can override the control exercised on the regulating device 9 by control means 8.

The sequence of operation is as follows: in the "off" position of control means 8 the field is supplied at a predetermined level by the pulse generator 5 and the armature is disconnected from supply by starting pulse generator 3. Initial movement of control means 8 results in regulating device 9 causing the starting pulse generator 3 to supply current to the armature. Further movement of the control means 8 causes the pulse generator means 3 to increase the supply to the armature until it is supplied at full line voltage, the motor meanwhile accelerating to its full field speed. Further movement of the control means 8 operates on the regulating device 7 to cause the pulse generator 5 to reduce the on/off ratio of the pulses to the field, thus weakening the field and causing the motor to accelerate further, up to the speeds determined by the minimum on/off ratio allowed by pulse generator 5.

If the load on the motor is increased so as to cause it to take more current than is appropriate to the existing field excitation, the voltage drop caused by the armature current through resistance 2, becomes greater than that caused by the field current through resistance 4. The values of resistances 2 and 4 are chosen to make the voltage drops equal at the desired ratio of currents. This difference is sensed by the sensing device 10 which passes a signal to the regulating device 7 which causes pulse generator 5 to increase the field excitation thus increasing the motor torque for a given armature current.

Return movement of the control means 8 from the full speed position towards the off position operates on the regulating device 7 to cause the pulse generator 5 to increase the field excitation and thus causes the armature back E.M.F. to rise and regenerative braking to take place, with consequent reversal of voltage across resistance 2. This reversal of voltage is detected by the sensing device 11 which passes a signal to the regulating device 9 so that, as long as a predetermined minimum regenerated current is flowing, the starting pulse generator 3 is constrained to remain in a condition which allows this current to flow, even if the control means 8 has been returned to a position at which it would normally have operated the regulating device 9 to cause the starting pulse generator 3 to impede or interrupt the flow of currents to or from the power supply.

Referring now to FIGURE 2, the components within the dotted box provide the pulse generator 3 and regulating device 9 for direct control of armature current during starting and low speed operation. A thyristor SCR 1 carries the armature current and its gate is fired by transistor T12 which is controlled by the oscillator formed by the timing circuit R15, T11 and C5, and the switching pair T9 and T10. It is switched off by discharging capacitor C10 through it in a reverse direction at a time determined by the firing of thyristor SCR 4, whose gate is fired by transistor T8, controlled by the switching pair T6 and T7 and the timing circuit R60 and C4. Component values are so arranged that as the potential of the point D falls from 27 volts to 18½ volts the pulses supplied to the armature vary from short pulses widely spaced to long pulses very closely spaced. The potential of point D (and hence D' via impedance converting circuit R8 and T2), is caused to fall by downward movement of the slider of control potentiometer VR1 which forms part of the control means 8. The slider is connected between a line maintained at 27 volts by resistances R1 and R2 and zener diode X1, and transistor T13, and a line maintained at 10 volts by resistance R21 and zener diode X3. When point D falls to 18½ volts (half its total range) the contactor S is closed by its coil S and relay RL1, whose coil RL1 is energised when transistor T25 conducts. This occurs only when base current can flow via R39 and transistor T26, that is, when emitter of T26 which is connected to point D' is more negative than its base which is maintained at 18.5 volts by R38 and R40. Further drop in the potential of point D' therefore has no influence on the armature pulse circuit but is arranged to weaken the field excitation, as will appear hereafter.

The armature 1 is connected to the positive end of the supply battery 12 via reversing contactor SR, SF and low resistance shunt 2 and to the negative supply via SCR 1. The reversing contactor includes hold-on coils F, R and control switch RS. The field 13 is connected to the positive supply by the field shunt 4. Connections to the indicated points of the feed-back circuit are taken from point AS-FS, and the common point Z via a condenser C11. The field 13 is connected to the negative supply via SCR 6 and a field contactor 14 whose coil is supplied through a key-switch 15 in the positive feed to the auxiliary circuits. The control means 8 includes a foot switch 16 which is operated by the manual or foot operated control means in such a way that it closes on the initial movement, further movement causing downward movement of the slider of control potentiometer VR1 with the results described above. When the foot switch is closed, one or other of the coils F or R of the reversing contactors will be energised, according to the direction selected by the reversing control switch RS, thus connecting the armature to the supply in the appropriate way.

Means for retaining the field current for regenerative braking comprises a diode D40 in series with an inductance L2, which are connected across SCR 1, so that regenerated current may be returned to the power source even though shorting contactor S is open. A relay is provided for contacts RL2 in parallel with the foot switch, and the coil of RL2 connected between the 27 volt line and the negative line via transistor T27, diodes D12 and D14, and resistance R41. When regeneration is taking place the top end of the regeneration diode D40 is negative with respect to the negative line and since its top end is connected to the emitter of the NPN transistor T27, this emitter will be driven negative to its base and the transistor will conduct. This energises coil RL2 and closes contacts RL2, thus one of the reversing contactors R or F will remain energised even though the foot switch is open and will remain so until regeneration current drops to the value determined by the component choice.

The field pulse generator 5 comprises main thyristor SCR 6, the "off" thyristor SCR 7, which when fired discharges capacitor C19 in reverse through SCR 6 to switch it off, and diode 6 (D42) so that field inductance will maintain current flow during the interpulse periods. Resistor R68 serves to charge capacitor C19 during the period that SCR 6 is "on."

The operation of the field pulse generator oscillators is as follows: the point FA is connected to the junction of the field winding and SCR 6 by resistor R37, and to the 27 volt line by diode D10. This point FA is substantially at zero potential during an "on" pulse, and at 27 volts during the interpulse or "off" period.

When point FA rises to 27 volts at the beginning of an "off" pulse, condenser C8 begins to charge from two sources, direct via R22 and also through transistor T14 and R3. When this condenser and hence the emitter of transistor T15, rises above the potential of the base of T15 which is tied by R24 to the 10 volt line, T15 will conduct thus causing T16 to conduct also. Thus the base of T17 is pulled down to the negative line by the volt drop in resistor R24 and T17 conducts and delivers a pulse to the trigger of the main SCR 6. The time of charging of C8, and hence the duration of the off period is varied by changing the current supplied by transistor T14, by altering the potential of its base. If the base is held at 27 volts then no current can flow and the condenser C8 is charged only by the current through R22, this condition giving the longest possible off period. For base potentials less than 27 volts current will flow through R23 and T14 to decrease the charging time of C8 and thus give a shorter off period. The method by which the base potential of T14 is controlled is as follows: The base is connected via diode D5 to the junction of R25 and the collector of NPN transistor T28. R25 is taken to the 27 volt line and the emitter of T28 is taken through R27 (=R25) to the 10 volt line. The base of T28 is connected via R26 to the point D' which as has been described has the same potential as the slider D of the control potentiometer VR1. It will be recalled that at the top or "off" position the potential of this point is 27 volts, at the mid position 18½ volts and at the bottom or full speed position 10 volts. Now for all potentials of the base of T28 above 18½ volts T28 is bottomed, and because R25=R27, the collector of T28 and hence the base of T14 will be at 18½ volts. This is during the first half of the downward movement of the slider of VR1, during which time the motor is being started by the armature pulse control system. Further drop in potential of point D between 18½ volts and 10 volts results in the voltage drop across R27 and hence R25 being reduced until with point D at 10 volts no current flows through R25 or R27 and hence potential of the base of T14 rises to 27 volts, and T14 is cut off.

To summarise, during the first half of the downward movement of control potentiometer VR1 the armature is progressively started while the off periods of the field pulse system remains short, i.e. a strong field is supplied. During the second half of the travel of VR1, the armature pulse system is short circuited by contactor S and the field off pulses are progressively increased in length i.e. the field is weakened. The sensing device 10 includes transistors T18, T19, T20 and associated circuitry.

In the event of excessive armature current, T18 conducts (as will be described below) and the potential at the bottom of R28 is reduced below 27 volts, hence the charging current of C8 is reduced and the length of the off pulse is decreased, and thus again increases field excitation independently of the position of the slider of VR1.

The feed back circuit operates thus: The emitter of T20 is connected to the armature shunt and its base through the biasing arrangement R32 and VR2 to the field shunt. The transistor T20 is biased by the preset resistor VR2 to such a point that it just not cut off when the voltage drops in the two shunts are equal. Since the collector load R30 is very high, the bases of T19 and T18 (which are impedance converters) are normally at 48 volts. If the armature current exceeds the desired ratio to the field current the transistor T20 will be cut off so that the voltage at its collector falls to a low value and T19 is switched on. Thus the base of T18, and its emitter, can drop to 10 volts (determined by diode D7) and the lower end of R28 and the base of T14 are reduced to this potential, with the result that the field excitation is increased, as will be described below.

The base of T14 is connected via D6 to emitter of T18, which point is also connected to the 27 volt line by D4 and the 48 volt line by R28. Thus when T18 is caused to conduct by excessive armature current, it reduces the potential of the base of T14 and thus increases the field pulse rate and hence field excitation independently of the position of the slider of VR1.

The "off" oscillator has capacitor C9 charged by the current through T21 and R33. When main field SCR 6 is fired on, the base of T21 drops from 27 volts to that of the base of T28, via D9. The charging current of C9 is that through R33, this depending on the difference between 27 volts and the potential at the base of T28. Thus at the same time that the off pulse length is increased, the on pulse length is decreased by the reduced charging time of C9.

A further example of this invention is now described by way of example. This example utilises the same pulse circuitry both for starting the motor and low speed operation and also for field control at higher speed operations.

Referring to FIGURE 3, a motor is provided which has an armature 1, and field winding 13. It is reversed by switches SF and SR arranged so that in the off condition the armature is connected across a resistor 24, which under running conditions is short circuited by switch S3. The field is permanently connected in series with a control box 21 of known construction and, by means of ganged switch elements 25, 26, 27, 28, 30 and 43 operable by coil S4, the two may be connected either across the supply in parallel with the armature or across the supply in series with the armature.

A diode 29 is connected as shown so that, whatever part or parts of the motor are being fed with pulses, the current may continue to flow in them by self-inductance when the pulse is "off." Low resistances 31 and 32 are provided such that in the shunt mode of operation at the desired ratio of field to armature current the voltage drop across these is the same. A transistor 33 is connected across these resistances through an averaging circuit so that if the armature current exceeds the chosen ratio to the field current the transistor will conduct.

In the control box 21 the pulse is initiated by firing the silicon controlled rectifier SCR 37 and ended by firing the silicon controlled rectifier SCR 38. The length of "on" pulse is fixed by a transistor oscillator of known construction, while the "off" period is variable and is determined by the rate of charge of condenser 36, in that transistors 34 and 35 conduct when the emitter of 34 goes positive with respect to its base. The emitter of 34 is connected via resistor 37 and variable resistors 38 or 39 to the point between the field winding and the control box 21, which point is, in effect, negative during an "on" pulse and positive during an "off" pulse, so that the charging time of condenser 36 is varied by altering the value of 37, 38 or 39.

The method of operation is as follows:

In the "off" position slider 42 is at the top of its travel. SR and SF connect the armature across resistor 24 and switch elements of coil S4 in the position shown, so that the field and control box are connected across the supply. Ganged switch elements 41 and 55 are operatively connected to the slider 42 in such a way that the elements are in the position shown both when in the off position and also when the slider has passed to bear on resistor 39. Initial movement of the operating lever coupled to slider 42 moves the elements 41 and 55 to their positions, thus energizing coil S4 to move the associated switch elements to their other positions. Simultaneously with 41 and 55 another switch is closed which energises the operating coil of either SR or SF according to which direction of rotation has been selected and also the operating coil of S3. The motor is now in the series mode of operation, and it is accelerated by decreasing the off pulse time by further downward movement of slider 42. When the slider reaches the junction of 38 and 39, the pulse rate is a maximum, and the supply voltage is practically applied directly to the motor.

Further downward movement of the slider returns 41 and 55 to the positions shown, thus the elements operated by S4 also return to position shown and the motor is now connected in the shunt mode with a reduced rate of pulsing, because resistor 37 is now introduced into the "on" trigger timing circuit. Further movement of slider 42 further reduces the pulse rate and weakens the field to cause the motor to accelerate, but if the armature current exceeds the chosen ratio to the average field current (as determined by resistors 31 and 32) transistor 33 conducts and augments the charging current of condenser 36, thus increasing the pulse rate and hence the field strength. With the slider in its ultimate downward position the pulse rate is such as to give the maximum desired speed of the motor in the absence of any signal from transistor 33.

By reversing the movement of the slider, the field strength is increased and the motor slows down. If the motor is driven from an external source it will re-generate. When the slider reaches the junction of 38 and 39 switch 55 is opened and hence coil S4 is de-energised and the associated elements of S4 returned to the other positions, putting motor in the series mode of operation. But if when the slider reaches the junction, the motor is re-generating at above a predetermined current, transistor 54 will be conducting and, its output being applied to the junction of coil S4 with switch 55 (if necessary through an amplifying arrangement) S4 will not be de-energised and the motor will remain in the shunt mode until re-generated current falls below the predetermined minimum. Because switch elements 51 and 28 are both closed, the pulse rate will not be appreciably reduced by further upwards movement of slider 42 until either of these elements opens. If the motor is still re-generating when the slider is returned to the off position switches S3, SR and SF will all return to their positions shown and the motor will provide rheostatic braking through resistor 4.

On electric vehicles it is usual to provide a series or compound motor with the object of obtaining good performance under starting and overload conditions, coupled with high speed under normal running conditions. Methods are known by which such a motor may be fed with pulses of current at variable on-off ratio, so that the motor may be started from rest at high efficiency.

Variable speed shunt wound motors have also been used giving good control characteristics and convenient electric braking, but performance on overloads is poor owing to the difficulty of providing and controlling efficiently the heavy field currents required under these conditions.

The apparatus described in the foregoing examples is advantageous in that it provides a combination of motor and control gear which couples the controllability and flexibility of the shunt motor with the good starting and high torque performance of the series motor while maintaining a high efficiency under all conditions and while returning to the power supply the maximum energy during regenerative braking.

The invention is not restricted to the details of the foregoing examples.

I claim:

1. In a vehicle having a battery and a shunt wound traction motor supplied thereby control apparatus for the motor comprising a pulse generator with input connections from the battery and output connections to the motor shunt field windings, a regulator operable on the pulse-generator to vary the average current to the field windings, current supply connections from the battery to the motor armature, and means for detecting when the ratio of the armature current to the average field current exceeds a predetermined value and thereupon operable to cause the regulating device to increase the average field current.

2. Control apparatus as claimed in claim 1 in which the regulator varies the on/off ratio of the pulses.

3. Control apparatus as claimed in claim 1 in which the pulse generator also supplies pulses to the armature during starting and means are provided for supplying current directly from the battery to the armature when a predetermined armature speed is exceeded.

4. Control apparatus as claimed in claim 1 and including in the supply connections to the armature a pulse generator having a manually controlled regulator operable on the pulse regulator for varying the average current to the armature.

5. Control apparatus as claimed in claim 1 and including means responsive to manual control, for increasing the average field winding current for regenerative braking.

6. Control apparatus as claimed in claim 1 and including a speed control, means responsive to rotation of the armature for maintaining the field winding excited when the speed control has been moved to the off position and means for connecting a resistance across the armature to provide rheostatic braking.

7. Control apparatus as claimed in claim 1 and including a speed control, and means responsive, when the control has been moved to the off position, to rotation of the armature for maintaining the field winding excited and for maintaining a path from the armature to the battery for regenerated current.

References Cited by the Examiner

UNITED STATES PATENTS

| | | | |
|---|---|---|---|
| 2,487,171 | 11/1949 | Perrine et al. | 318—269 |
| 3,047,729 | 7/1962 | Peterson et al. | 318—338 X |

ORIS L. RADER, *Primary Examiner.*

J. C. BERENZWEIG, *Assistant Examiner.*